(12) United States Patent
Byrne et al.

(10) Patent No.: US 9,626,266 B1
(45) Date of Patent: Apr. 18, 2017

(54) ERROR SIMULATOR FOR A TEST PLATFORM

(71) Applicant: Synchronoss Technologies, Inc., Bridgewater, NJ (US)

(72) Inventors: Eoin Byrne, Dublin (IE); Dan Costelloe, Co Dublin (IE)

(73) Assignee: Synchronoss Technologies, Inc., Bridgewater, NJ (US)

( * ) Notice: Subject to any disclaimer, the term of this patent is extended or adjusted under 35 U.S.C. 154(b) by 152 days.

(21) Appl. No.: 14/671,469

(22) Filed: Mar. 27, 2015

Related U.S. Application Data

(60) Provisional application No. 62/084,176, filed on Nov. 25, 2014.

(51) Int. Cl.
*G06F 11/00* (2006.01)
*G06F 11/26* (2006.01)

(52) U.S. Cl.
CPC .................. *G06F 11/261* (2013.01)

(58) Field of Classification Search
CPC ..................................... G06F 11/261
See application file for complete search history.

(56) References Cited

U.S. PATENT DOCUMENTS

| | | | | |
|---|---|---|---|---|
| 8,627,146 B2* | 1/2014 | Bailey | ........... | G06F 11/3692 714/33 |
| 9,160,653 B2* | 10/2015 | Chewter | ........... | H04L 43/00 |
| 2004/0003068 A1* | 1/2004 | Boldman | ........... | H04L 12/2697 709/223 |
| 2006/0107152 A1* | 5/2006 | Stobie | ........... | G06F 11/3688 714/736 |
| 2006/0265627 A1* | 11/2006 | Trump | ........... | G06F 11/3688 714/30 |
| 2007/0025261 A1* | 2/2007 | Ginsberg | ........... | H04L 43/50 370/250 |
| 2010/0241904 A1* | 9/2010 | Bailey | ........... | G06F 11/3692 714/38.1 |
| 2013/0332625 A1* | 12/2013 | Chewter | ........... | H04L 43/00 709/238 |
| 2014/0047275 A1* | 2/2014 | Eddington | ........... | G06F 11/3672 714/37 |
| 2014/0129878 A1* | 5/2014 | Saltzman | ........... | H04L 67/2804 714/38.1 |

(Continued)

*Primary Examiner* — Christopher McCarthy
(74) *Attorney, Agent, or Firm* — Synchronoss Technologies, Inc.; Frederick W. Dour

(57) ABSTRACT

Embodiments of the present invention relate to an error simulator for a test platform. The test platform includes a test process, a system under test (SUT), the error simulator and at least one downstream system. The error simulator is a transparent proxy that intercepts traffic from/to the SUT. The error simulator forwards only "success" commands from the SUT to the downstream system(s) and forwards actual responses from the downstream system(s) to the SUT. However, when the error simulator receives a "failure" command from the SUT, the error simulator automatically returns a corresponding error message that is obtained from preprogrammed failure information to the SUT. The preprogrammed failure information details one or more "failure" commands and corresponding error messages, and is received from the test process by the error simulator either prior to the start of testing or immediately preceding a failure during a test.

15 Claims, 3 Drawing Sheets

(56) References Cited

U.S. PATENT DOCUMENTS

2015/0180950 A1* 6/2015 Hishioka ............. G06F 11/3664
                                                    702/108
2016/0147647 A1* 5/2016 Ledenev ............. G06F 11/3696
                                                    714/38.1

* cited by examiner

ERROR SIMULATOR FOR A TEST PLATFORM

RELATED APPLICATIONS

This application claims benefit of priority under 35 U.S.C. section 119(e) of the U.S. Provisional Patent Application Ser. No. 62/084,176, filed Nov. 25, 2014, entitled "ERROR SIMULATOR FOR TEST PLATFORM," which is hereby incorporated by reference in its entirety.

FIELD OF INVENTION

The present invention relates to systems under test (SUTs). More particularly, the present invention relates to an error simulator for a test platform.

BACKGROUND OF THE INVENTION

The systems development life cycle describes a process for planning, creating, testing and deploying a system. System under test (SUT) is a term that refers to a system that is being tested to determine its performance and proficiency. This is normally done by stepping through or operating a program with the intent of finding errors or problems in the system. Any errors that occur during the testing phase are to be fixed prior to the next phase in the systems development life cycle.

BRIEF SUMMARY OF THE INVENTION

Embodiments of the present invention relate to an error simulator for a test platform. The test platform includes a test process, a system under test (SUT), the error simulator and at least one downstream system. The error simulator is a transparent proxy that intercepts traffic from/to the SUT. The error simulator forwards only "success" commands from the SUT to the downstream system(s) and forwards actual responses from the downstream system(s) to the SUT. However, when the error simulator receives a "failure" command from the SUT, the error simulator automatically returns a corresponding error message that is obtained from preprogrammed failure information to the SUT. The preprogrammed failure information details one or more "failure" commands and corresponding error messages, and is received from the test process by the error simulator either prior to the start of testing or immediately preceding a failure during a test.

In one aspect, a non-transitory computer-readable medium is provided. The non-transitory computer-readable medium stores instructions that, when executed by a computing device, cause the computing device to perform a method. The method includes communicating with a test process, a system under test (SUT) and at least one downstream system, receiving a command from the SUT, performing a first set of procedures when the command from the SUT is a first type, and performing a second set of procedures when the command from the SUT is a second type.

In some embodiments, the method further includes receiving preprogrammed failure information from the test process. The preprogrammed failure information is received from the test process prior to the start of a test. Alternatively, the preprogrammed failure information is received from the test process immediately preceding a failure during a test.

In some embodiments, the method further includes checking the command received from the SUT against the preprogrammed failure information received from the test process.

In some embodiments, the first type is a nonprogrammed command, and the first set of procedures includes forwarding the command from the SUT to one of the at least one downstream system that the command from the SUT is intended for, receiving a response from the one of the at least one downstream system, and echoing the response from the one of the at least one downstream system back to the SUT.

In some embodiments, the second type is a preprogrammed failure command in the preprogrammed failure information, and the second set of procedures includes one of automatically replying back to the SUT with a corresponding error code and not sending any response back to the SUT. In some embodiments, the corresponding error code is detailed in the preprogrammed failure information that is received from the test process.

In another aspect, a computing device is provided. The computing device includes a non-transitory memory for storing an application and a processing component coupled to the memory. The processing component is configured for processing the application. The application is for automatically receiving preprogrammed failure information from a test process that is communicatively coupled with the computing device, determining whether a command received from a system under test (SUT) corresponds with the preprogrammed failure information, wherein the SUT is communicatively coupled with the computing device and the test process, based on the determination that the command does not correspond with the preprogrammed failure information, returning a first data to the SUT, and based on the determination that the command corresponds with the preprogrammed failure information, returning a second data to the SUT.

In some embodiments, returning a first data to the SUT includes forwarding the command to a downstream system, and receiving a response from the downstream system, wherein the first data is the response from the downstream system.

In some embodiments, returning a second data to the SUT includes obtaining an associated error code from the preprogrammed failure information, wherein the second data is the associated error code from the preprogrammed failure information.

In yet another aspect, a system for testing a system under test is provided. The system includes a system under test (SUT), a test process for testing the SUT, wherein the test process includes preprogrammed failure information, and a transparent proxy downstream of the SUT and the test process. The transparent proxy is configured to receive a command from the SUT, perform a first set of procedures when the command from the SUT is a first type, and perform a second set of procedures when the command from the SUT is a second type.

In some embodiments, the transparent proxy is further configured to receive preprogrammed failure information from the test process. The preprogrammed failure information is received from the test process prior to the start of a test. Alternatively, the preprogrammed failure information is received from the test process immediately preceding a failure during a test.

In some embodiments, the transparent proxy is further configured to check the command received from the SUT against the preprogrammed failure information received from the test process.

In some embodiments, the first type is a nonprogrammed command, and the first set of procedures includes the transparent proxy forwarding the command from the SUT to a downstream system that the command from the SUT is intended for, the transparent proxy receiving a response from the downstream system, and the transparent proxy echoing the response from the downstream system back to the SUT.

In some embodiments, the second type is a preprogrammed failure command in the preprogrammed failure information, and the second set of procedures includes one of the transparent proxy automatically replying back to the SUT with a corresponding error code and the transparent proxy not sending any response back to the SUT. In some embodiments, the corresponding error code is detailed in the preprogrammed failure information that is received from the test process.

In some embodiments, the test process also includes a sequence of instructions for testing the SUT.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Figure 1A:
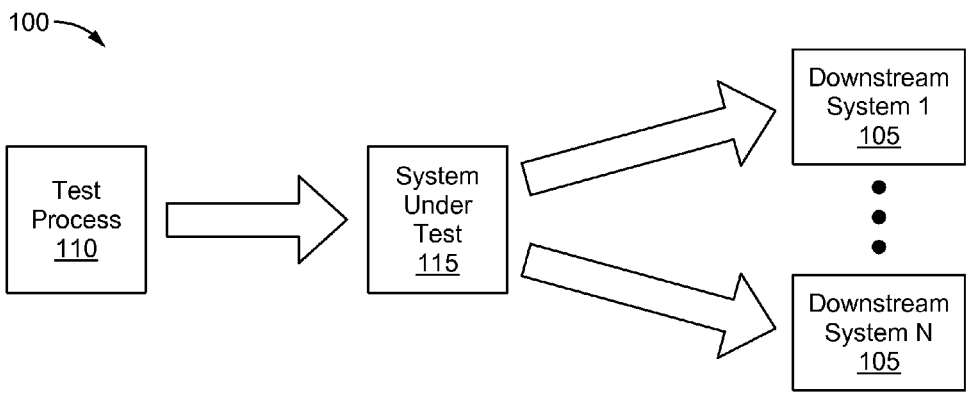
FIG. 1A illustrates an exemplary test platform in accordance with some embodiments.

FIG. 1A illustrates an exemplary test platform 100 in accordance with some embodiments. The test platform 100 includes at least one downstream system 105, a test process 110 and a system under test (SUT) 115. The test process 100 typically includes functions, commands, instructions and/or tools for testing the SUT 115. The SUT 115 communicates with the downstream systems 105 via representational state transfer (REST) interfaces or other suitable interfaces. Each of these interfaces typically includes a published list of error codes that can be transmitted and messages that can be sent under different scenarios. Each of the components 105-115 can be software, hardware or a combination thereof. The arrows illustrated in FIG. 1A represent opening conversations. Although opening conversations are shown as being unidirectional in FIG. 1A, opening conversations can be bidirectional. For example, a downstream system 105 can query the SUT 115 (arrow not illustrated).

To test each of these error codes, a tester or test team (generally, tester) traditionally would need to induce these error scenarios in each downstream system, which is generally difficult if not impossible to accomplish. A customized mock up for each downstream system that will throw specific errors could be used. However, developing or creating mock ups becomes unwieldy when communication flows are complicated. For example, an exemplary mock up could be a web server that serves a single file at a single URL. A simple web application could be written to respond with any number of error messages with ease. However, a more complex downstream system, like a FTP server, is unwieldy to mock up because the failure a tester may want to simulate could be 10 calls into a flow. In these cases, the mock up would need to take on the logic of the application to get the call flow to the point the tester wants to fail. If the call flow has dynamic components, such as IDs and states, the mock up could quickly approach the complexity of the actual downstream system, which can be far too much effort to expect a tester or test team to be able to expend on a single test case.

Embodiments of the present invention relate to an error simulator for a test platform. The test platform includes a test process, a system under test (SUT), the error simulator and at least one downstream system. The error simulator is a transparent proxy that intercepts traffic from/to the SUT. The error simulator forwards only "success" commands from the SUT to the downstream system(s) and forwards actual responses from the downstream system(s) to the SUT. However, when the error simulator receives a "failure" command from the SUT, the error simulator automatically returns a corresponding error message that is obtained from preprogrammed failure information to the SUT. The preprogrammed failure information details one or more "failure" commands and corresponding error messages, and is received from the test process by the error simulator either prior to the start of testing or immediately preceding a failure during a test.

Figure 1B:
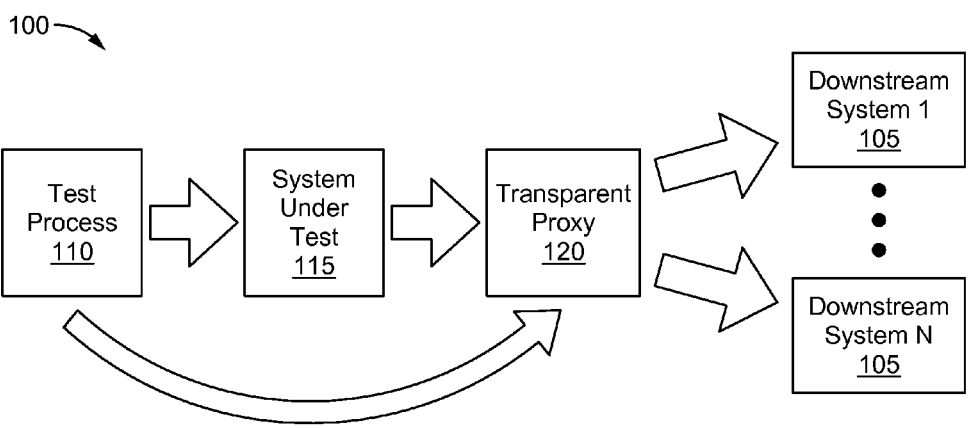
FIG. 1B illustrates a transparent proxy included as part as the exemplary test platform in accordance with some embodiments.

FIG. 1B illustrates a transparent proxy included as part as the exemplary test platform 100 in accordance with some embodiments. The transparent proxy 120 is located between the SUT 115 and the genuine or real-world downstream systems 105. In some embodiments, the transparent proxy 120 and the downstream systems 105 are separated by a network, such as the Internet. The SUT 115 typically has not been modified. As such, from its point of view, the SUT 115 is still communicating with the downstream systems 105 (e.g., hostnames and ports remain the same). The SUT 115 still sends commands or messages as normal. However, the transparent proxy 120 will receive the messages from the SUT 115 and, unless commanded otherwise, will send the messages to the downstream systems 105 that the messages were intended for and will echo the responses from the downstream systems 105 back to the SUT 115.

The test process 110 is configured to instruct the transparent proxy 120 to fail on certain commands or requests. These instructions are included as part of the preprogrammed failure information, which is provided by the test process 110 to the transparent proxy 120 either prior to the start of a test or immediately preceding a failure during a test. When a tester writes a test to cover a downstream failure, the tester can cause an error at an exact point in the flow the tester requires without having to write any code to support the steps the tester wants to complete successfully. In other words, success cases do not need to be mocked up because nonprogrammed commands simply default to existing system behavior. In contrast, preprogrammed failure commands and corresponding exact failure responses are controlled via the preprogrammed failure information.

The transparent proxy 120 is able to fail on command and allows simulation of nearly every type of error that can be thrown by a downstream REST interface, which allows a tester to simulate errors in downstream systems that would be difficult or impossible to test otherwise, thereby enabling the tester to ensure the SUT reacts correctly to all manner of downstream failures. As explained above, a traditional solution that uses preprogrammed mock ups of downstream systems can becomes unmanageable when components involved have anything but trivial interactions because catering to success cases quickly likely introduces complexity to the point that the test becomes unmanageable.

Figure 2:
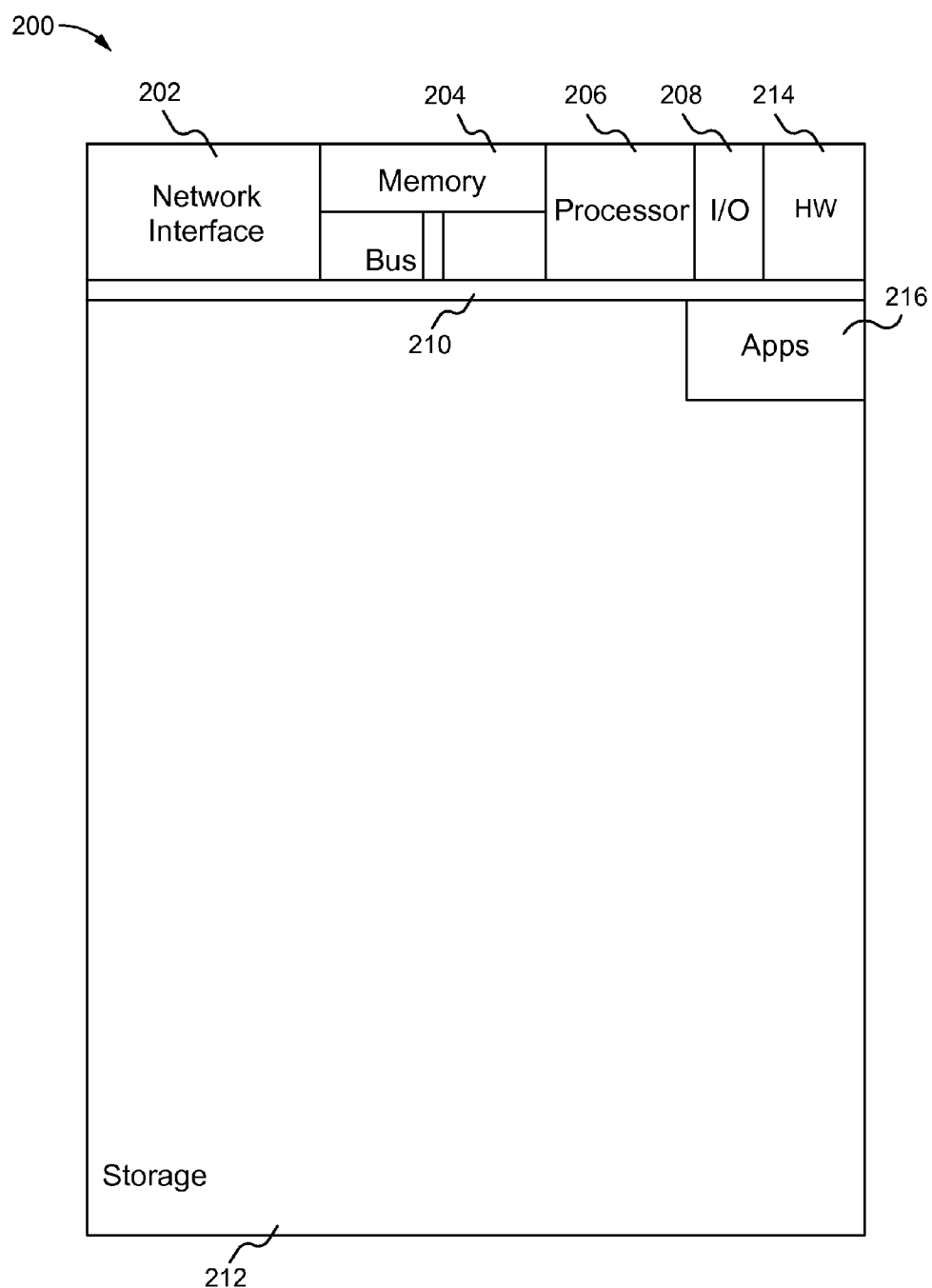
FIG. 2 illustrates a block diagram of an exemplary computing device in accordance with some embodiments.

FIG. 2 illustrates a block diagram of an exemplary computing device 200 in accordance with some embodiments. The computing device 200 is able to be used to acquire, cache, store, compute, search, transfer, communicate and/or display information. The transparent proxy 120 of the FIG. 1B can be similarly configured as the computing device 200.

In general, a hardware structure suitable for implementing the computing device 200 includes a network interface 202, a memory 204, processor(s) 206, I/O device(s) 208, a bus 210 and a storage device 212. The choice of processor 206 is not critical as long as a suitable processor with sufficient speed is chosen. In some embodiments, the computing device 200 includes a plurality of processors 206. The memory 204 is able to be any conventional computer memory known in the art. The storage device 212 is able to include a hard drive, CDROM, CDRW, DVD, DVDRW, flash memory card, RAM, ROM, EPROM, EEPROM or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, button interface and other devices. Application(s) 214 are likely to be stored in the storage device 212 and memory 204 and are processed by the processor 206. More or less components shown in FIG. 2 are able to be included in the computing device 200. The computing device 200 can be a server, a tablet, a mobile phone, a smart phone, a desktop computer, a laptop computer, a netbook, or any suitable computing device such as special purpose devices.

Figure 3:
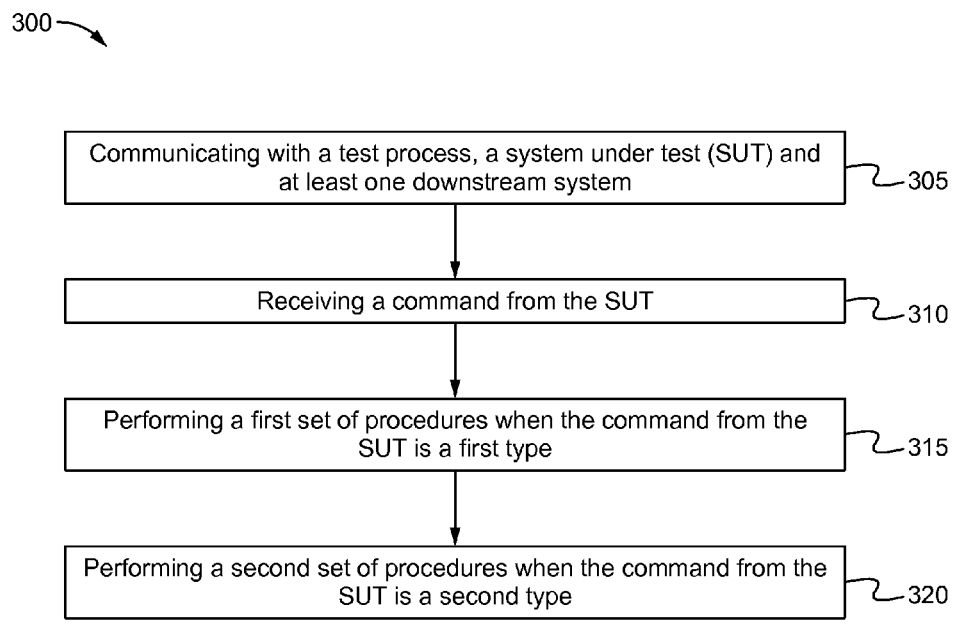
FIG. 3 illustrates an exemplary method in accordance with some embodiments.

FIG. 3 illustrates an exemplary method 300 in accordance with some embodiments. The method 300 is typically performed by the transparent proxy 120 of FIG. 1B. At a Step 305, the transparent proxy is in communication with a test process, a system under test (SUT) and at least one downstream system. The test process includes a sequence of instructions for testing the SUT. The test process also includes preprogrammed failure information, which is provided to the transparent proxy. In some embodiments, the preprogrammed failure information is received from the test process prior to the start of a test. Alternatively, the preprogrammed failure information is received from the test process immediately preceding a failure during a test.

At a Step 310, the transparent proxy receives a command from the SUT. In some embodiments, the transparent proxy checks the command received from the SUT against the preprogrammed failure information received from the test process.

At a Step 315, the transparent proxy performs a first set of procedures when the command from the SUT is a first type. In some embodiments, the first type is a nonprogrammed command, and the first set of procedures includes the transparent proxy forwarding the command from the SUT to one of the at least one downstream system that the command from the SUT is intended for, the transparent proxy receiving a response from the one of the at least one downstream system, and the transparent proxy echoing the response from the one of the at least one downstream system back to the SUT.

At a Step 320, the transparent proxy performs a second set of procedures when the command from the SUT is a second type. In some embodiments, the second type is a preprogrammed failure command that is detailed in the preprogrammed failure information. In some embodiments, the second set of procedures includes the transparent proxy automatically replying back to the SUT with a corresponding error code. In some embodiments, the corresponding error code is also detailed in the preprogrammed failure information that is received from the test process. Alternatively, the second set of procedures includes not sending any response back to the SUT to simulate a dropped packet (e.g., socket timeouts, high packet loss, etc.).

In an exemplary scenario, assume a SUT is a system that translates tweets from English to Spanish and that communicates with a genuine downstream system, Twitter®. A test process includes instructions to create and to delete tweets. During testing, the test process creates a tweet in English, and the request goes to the SUT. The SUT translates the tweet into Spanish and sends the translated tweet to Twitter®. The transparent proxy intercepts and proxies the communication to Twitter®, receives a response from Twitter® and forwards the response from Twitter® to the SUT. The SUT may or may not forward the response to the test process. The test process is able to thereafter create more tweets, to search for tweets, and/or to delete tweets. The test process then instructs the transparent proxy via preprogrammed failure information that the next time the transparent proxy receives a command to delete a tweet from the SUT, the transparent proxy fails with an error instead of forwarding the delete command to Twitter®. The test process thereafter continues by sending a delete command to the SUT, which sends the delete command to Twitter®. However, the delete command is intercepted by the transparent proxy. Because the transparent proxy has been told by the test process to fail on the next delete command, the transparent proxy responds with the exact failure response as specified in the preprogrammed failure information rather than forwarding the delete command to Twitter®. As demonstrated in the hypothetical, the transparent proxy passes on normal behaviors until it is told to fail. Once the transparent proxy is told to fail, it will respond as if one of the downstream systems (e.g., Twitter®) has failed when in fact it has not. The test platform in this exemplary scenario is able to test what happens when a person is trying to delete a tweet while driving through a tunnel.

In some embodiments, a test process includes test instructions and preprogrammed failure information. The test instructions are intended for a SUT, and the preprogrammed failure information is intended for a transparent proxy. The test instructions and the preprogrammed failure information can be maintained together or separately. Both the test instructions and the preprogrammed failure information are configured by a tester.

In some embodiments, the preprogrammed failure information is organized in a table, although other organizations are contemplated. The table includes one or more preprogrammed failures. In some embodiments, the failures can be based on URL-based matching or header-based matching using regular expressions, which allows for a powerful way to trigger specific failures. The table also includes a corresponding failure response for each of the one or more preprogrammed failures. A failure response could be an error code/message or could simply be a no response at all. For example, when a failure is triggered, the exact response can be set, which includes hypertext transfer protocol (HTTP) error codes, response body and headers. The preprogrammed failure information allows a tester a very fine level of control over a test scenario and provides the ability to set application specific subcodes. It should be noted that the transparent proxy works over HTTP and other suitable protocols.

The present solution allows for success cases to be handled by real or genuine downstream systems or components. A tester is thus required to configure only error scenarios, but not success cases, in the preprogrammed failure information. Since success cases require assumptions and takes time to configure and, for complicated flows, the error scenarios make up a small fraction of the success cases, configuring only error scenarios advantageously leads to simpler tests. Simpler tests are quicker to write and easier to maintain, especially considering the success case flows can change.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A non-transitory computer-readable medium storing instructions that, when executed by a computing device, cause the computing device to perform a method, the method comprising:
   communicating with a test process, a system under test (SUT) and at least one downstream system;
   receiving a command from the SUT;
   performing a first set of procedures when the command from the SUT is a first type;
   performing a second set of procedures when the command from the SUT is a second type; and
   receiving preprogrammed failure information from the test process wherein the preprogrammed failure information is received from the test process immediately preceding a failure during a test.

2. The non-transitory computer-readable medium of claim 1, wherein the preprogrammed failure information is received from the test process prior to the start of a test.

3. The non-transitory computer-readable medium of claim 1, wherein the method further comprises checking the command received from the SUT against the preprogrammed failure information received from the test process.

4. The non-transitory computer-readable medium of claim 3, wherein the first type is a nonprogrammed command, and wherein the first set of procedures includes:
   forwarding the command from the SUT to one of the at least one downstream system that the command from the SUT is intended for;
   receiving a response from the one of the at least one downstream system; and
   echoing the response from the one of the at least one downstream system back to the SUT.

5. The non-transitory computer-readable medium of claim 3, wherein the second type is a preprogrammed failure command in the preprogrammed failure information, and wherein the second set of procedures includes one of automatically replying back to the SUT with a corresponding error code and not sending any response back to the SUT.

6. The non-transitory computer-readable medium of claim 5, wherein the corresponding error code is detailed in the preprogrammed failure information that is received from the test process.

7. A computing device comprising:
   a non-transitory memory for storing an application, the application for automatically:
      receiving preprogrammed failure information from a test process that is communicatively coupled with the computing device;
      determining whether a command received from a system under test (SUT) corresponds with the preprogrammed failure information, wherein the SUT is communicatively coupled with the computing device and the test process;
      based on the determination that the command does not correspond with the preprogrammed failure information, returning a first data to the SUT; and
      based on the determination that the command corresponds with the preprogrammed failure information, returning a second data to the SUT, wherein returning the second data to the SUT includes obtaining an associated error code from the preprogrammed failure information, wherein the second data is the associated error code from the preprogrammed failure information; and
   a processing component coupled to the memory, the processing component configured for processing the application.

8. The computing device of claim 7, wherein returning a first data to the SUT includes:
   forwarding the command to a downstream system; and
   receiving a response from the downstream system, wherein the first data is the response from the downstream system.

9. A system for testing a system under test, the system comprising:
   a system under test (SUT);
   a test process for testing the SUT, wherein the test process includes preprogrammed failure information; and
   a transparent proxy downstream of the SUT and the test process, wherein the transparent proxy is configured to:
      receive a command from the SUT;
      perform a first set of procedures when the command from the SUT is a first type;
      perform a second set of procedures when the command from the SUT is a second type; and
      receive preprogrammed failure information from the test process,
      wherein the preprogrammed failure information is received from the test process immediately preceding a failure during a test.

10. The system of claim 9, wherein the preprogrammed failure information is received from the test process prior to the start of a test.

11. The system of claim 9, wherein the transparent proxy is further configured to check the command received from the SUT against the preprogrammed failure information received from the test process.

12. The system of claim 11, wherein the first type is a nonprogrammed command, and wherein the first set of procedures includes:

the transparent proxy forwarding the command from the SUT to a downstream system that the command from the SUT is intended for;

the transparent proxy receiving a response from the downstream system; and the transparent proxy echoing the response from the downstream system back to the SUT.

13. The system of claim 11, wherein the second type is a preprogrammed failure command in the preprogrammed failure information, and wherein the second set of procedures includes one of the transparent proxy automatically replying back to the SUT with a corresponding error code and the transparent proxy not sending any response back to the SUT.

14. The system of claim 13, wherein the corresponding error code is detailed in the preprogrammed failure information that is received from the test process.

15. The system of claim 9, wherein the test process also includes a sequence of instructions for testing the SUT.

\* \* \* \* \*